US009773195B2

(12) United States Patent
Feris et al.

(10) Patent No.: US 9,773,195 B2
(45) Date of Patent: *Sep. 26, 2017

(54) USER-CONFIGURABLE SETTINGS FOR CONTENT OBFUSCATION

(71) Applicant: International Business Machines Corporation, Armonk, NY (US)

(72) Inventors: Rogerio S. Feris, Hartford, CT (US); Itzhack Goldberg, Hadera (IL); Minkyong Kim, Scarsdale, NY (US); Clifford A. Pickover, Yorktown Heights, NY (US); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/285,727

(22) Filed: Oct. 5, 2016

(65) Prior Publication Data

US 2017/0132495 A1    May 11, 2017

Related U.S. Application Data

(63) Continuation of application No. 14/938,345, filed on Nov. 11, 2015, now Pat. No. 9,471,852.

(51) Int. Cl.
  *G06K 9/62* (2006.01)
  *G06F 17/30* (2006.01)
  (Continued)

(52) U.S. Cl.
  CPC ....... *G06K 9/6269* (2013.01); *G06F 17/3082* (2013.01); *G06N 3/08* (2013.01);
  (Continued)

(58) Field of Classification Search
  CPC .... G06K 9/6267; G06K 9/66; G06F 17/3082; G06F 17/30828; H04N 5/85; G11B 27/034; G11B 27/102; G11B 27/28
  See application file for complete search history.

(56) References Cited

U.S. PATENT DOCUMENTS

| 6,959,099 B2 | 10/2005 | Gutta et al. |
| 8,098,904 B2 | 1/2012 | Ioffe et al. |

(Continued)

FOREIGN PATENT DOCUMENTS

CA    2725789 A1    4/2010

OTHER PUBLICATIONS

List of IBM Patents or Patent Applictions Treated as Related; (Appendix P), Filed Nov. 14, 2016, 2 pages.

(Continued)

*Primary Examiner* — Huy T Nguyen
(74) *Attorney, Agent, or Firm* — Cantor Colburn LLP; Alexa Ashworth

(57) ABSTRACT

An aspect of providing user-configurable settings for content obfuscation includes, for each media segment in a media file, inputting the media segment to a neural network, applying a classifier to features output by the neural network, and determining from results of the classifier images in the media segment that contain the sensitive characteristics. The classifier specifies images that are predetermined to include sensitive characteristics. An aspect further includes assigning a tag to each of the images in the media segment that contain the sensitive characteristics. The tag indicates a type of sensitivity. An aspect also includes receiving at least one user-defined sensitivity, the user-defined sensitivity indicating an action or condition that is considered objectionable to a user, identifying a subset of the tagged images that correlate to the user-defined sensitivity, and visually (Continued)

modifying, during playback of the media file, an appearance of the subset of the tagged images.

20 Claims, 4 Drawing Sheets

(51) Int. Cl.
    *G11B 27/034*     (2006.01)
    *G06N 3/08*     (2006.01)
    *H04N 5/85*     (2006.01)
    *G11B 27/10*     (2006.01)

(52) U.S. Cl.
    CPC .......... *G11B 27/034* (2013.01); *G11B 27/102* (2013.01); *H04N 5/85* (2013.01)

(56) References Cited

U.S. PATENT DOCUMENTS 8,723,912 B2     5/2014     Michrowski et al.
    9,471,852 B1*   10/2016     Feris ................ G06F 17/30828

OTHER PUBLICATIONS

Dale Kunkel, "The Effects of Television Violence on Children", American Psychological Association, Jun. 26, 2007, p. 1-6.
Deborah L. Davids, "Protect Your Brain From Images of Violence and Cruelty", Psychology Today, Dec. 22, 2013, p. 1-5.
Laura A. Daly, et al.,"Exposure to Media Violence and Other Correlates of Aggressive Behavior in Preschool Children" ECRP, vol. 11, No. 2, 2009, p. 1-14.

* cited by examiner

USER-CONFIGURABLE SETTINGS FOR CONTENT OBFUSCATION

DOMESTIC PRIORITY

This application is a continuation of U.S. patent application Ser. No. 14/938,345, filed Nov. 11, 2015, the content of which is incorporated by reference herein in its entirety.

BACKGROUND

The invention relates generally to information processing, and more specifically, to user-configurable settings for content obfuscation.

Different types of audiences may have varying degrees of sensitivities when it comes to experiencing certain video content. For example, images depicting violence or cruelty may not be suitable for young children who have not yet developed self-soothing skills necessary to cope with the distress induced by witnessing the violence. In addition, violent images can have a harmful effect on those individuals who may suffer from post traumatic stress disorder (PTSD) or other sensitivities.

SUMMARY

According to an embodiment a method, system, and computer program product for providing user-configurable settings for content obfuscation is provided. A method includes for each media segment in a media file, inputting, via a computer processor, the media segment to a neural network, applying a classifier to features output by the neural network, and determining from results of the classifier images in the media segment that contain the sensitive characteristics. The classifier specifies images that are predetermined to include sensitive characteristics. The method also includes assigning, via the computer processor, a tag to each of the images in the media segment that contain the sensitive characteristics, receiving at least one user-defined sensitivity, and identifying a subset of the tagged images that correlate to the user-defined sensitivity. The user-defined sensitivity indicates an action or condition that is considered objectionable to a user. The method further includes visually modifying, during playback of the media file, an appearance of the subset of the tagged images.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Exemplary embodiments provide user-configurable settings for content obfuscation. The user-configurable settings for content obfuscation provide modification of video elements based on user-defined sensitivities. The sensitivities may include, e.g., emotional response, privacy, security, or other sensitivities. Elements subject to obfuscation may include images depicting objects used in the commission of violent acts, faces of people subject to privacy concerns, victims of violence, or any element that is determined to contribute to the defined sensitivities. In an embodiment, the user-configurable settings for content obfuscation estimates the potential harm caused to a particular user if the system did not obfuscate the content. This allows for active learning used to optimize, through time, the nature of the obfuscation. The user-configurable settings for content obfuscation are configured to use prediction, machine learning algorithms, and neural networks, such as a deep convolutional neural network.

Figure 1:
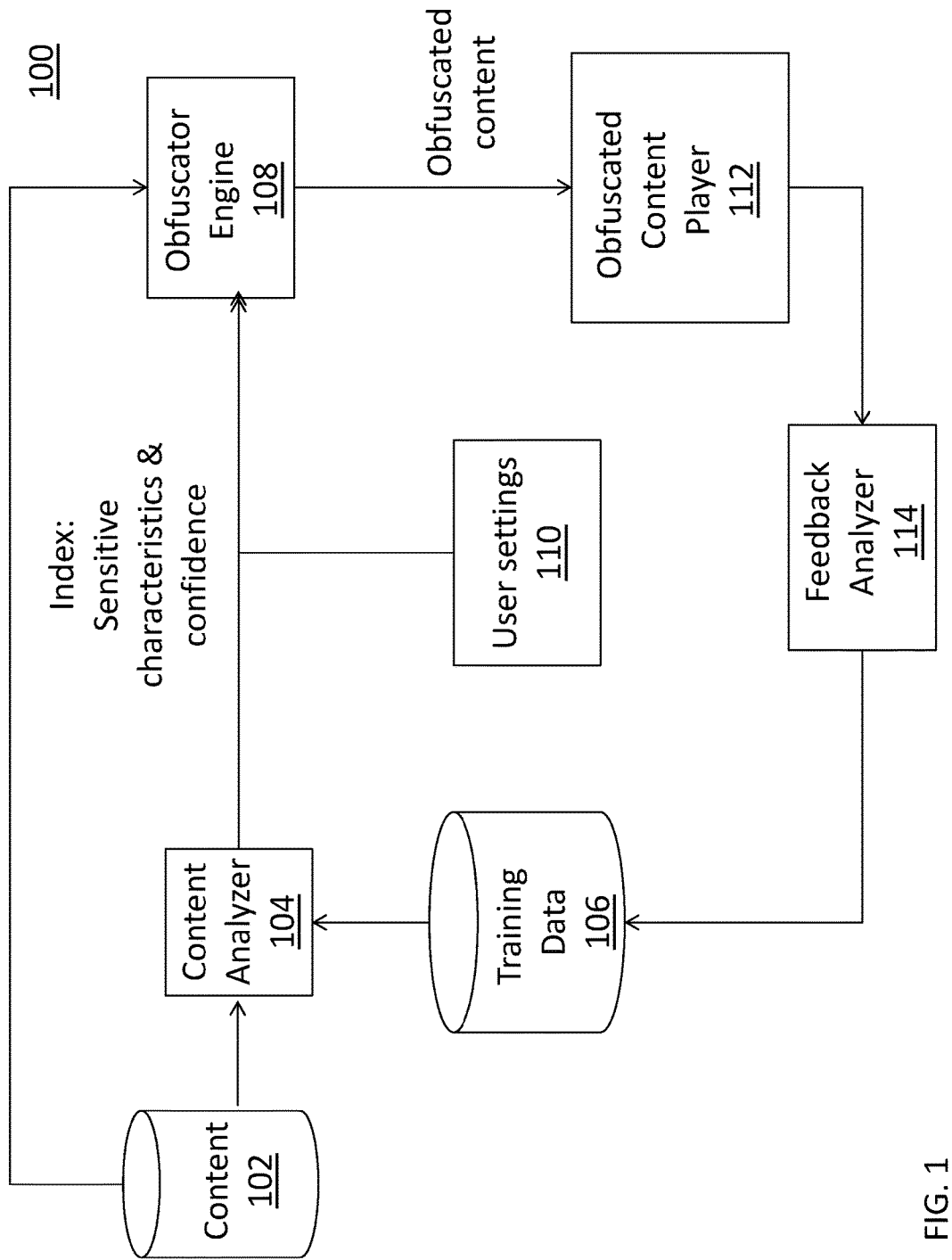
FIG. 1 depicts a block diagram of a component architecture upon which user-configurable settings for content obfuscation may be implemented in accordance with an embodiment of the invention.

Turning now to FIG. 1, a component architecture 100 for implementing user-configurable settings for content obfuscation will now be described in accordance with an embodiment.

The architecture 100 includes media content 102, a content analyzer 104, and training data 106. The content 102 may be multimedia content, such as consumer programming. Alternatively, the content 102 may be a surveillance or security video. The training data 106 may be created from a corpus of input videos. Using learning techniques, high-level features (e.g., blood, weapon, lying body, etc.) are identified from the inputs. A classifier, such as a support vector machine, can be applied to the features to predict sensitive content or elements, as well as a confidence value that indicates a degree to which the features represent sensitive subject matter.

In an embodiment, the content 102 is analyzed against the training data 106 via the content analyzer 104, and the content analyzer 104 generates a content index including sensitive characteristics and a corresponding confidence score. The content analyzer 104 may include machine learning techniques, such as a neural network to process the content. The content is also referred to herein as a media file. In an embodiment, the media file may be broken down into media segments or video frames and processed by the neural network to produce high-level features that are extracted, e.g., from the last layer of the neural network. A feature vector is formed from the set of features, which is fed to a classifier. Based on the classifier, a sensitivity indication is determined for the media segment. The media segment is tagged to indicate its sensitivity. In an embodiment, the tag may specify a type of sensitivity based on the results of the classifier. For example, if the media segment contains a human face, the tag may indicate a type 'private,' while a media segment containing a disfigured or otherwise injured human face may be tagged with a tag type 'emotional response.' In the first example, the tag 'private' may be used for sensitivities in which a person's identity is to be protected, while in the second example, the tag 'emotional response' may be used for sensitivities in which a person is emotionally impacted by certain images (e.g., young children, individuals with PTSD, etc.).

The confidence score indicates a value representing the level of confidence that a selected image from the content 102 matches an image from the training data 106. The confidence score may be calculated by analysis of the content. In an embodiment, the content may be processed using natural language processing (NLP) techniques, voice stress analysis, and/or contextual information. Voice stress analysis may be analyzed through one or more techniques implemented by the content analyzer 104 that detects and evaluates amplitude and frequency of audio components. In one embodiment, e.g., if the NLP analysis determines that the word "blood" has been uttered, and within a proximate threshold time period the voice stress analysis reflects that a scream has been uttered, the process may infer a high confidence that the subject matter contains sensitive subject matter. In addition, the confidence score may be determined for different cohorts of viewers of the content. For example, if the viewer is likely to be someone with greater than average sensitivities (e.g., autism, pre-Alzheimer' s, or PTSD), then the confidence score for sensitive subjects may be increased, as these individuals may be more likely to find certain content objectionable. In one example, if a classifier suggests that blood is shown in the content, and the word blood is uttered in a stressed voice, and the viewer suffers from PTSD (e.g., as determined by a user profile that is accessible to the content analyzer 104, analysis of the viewer's facial expressions (e.g., conveyed from a facial features analysis component at a user device to the content analyzer 104, etc.), then the confidence that the matter is sensitive is increased. In addition, viewer voting may be used to change the confidence levels. For example, if a movie scene of blood is voted by viewers to be stressful (including the use of voting done via biometric analysis of one or more viewers), then the next time this movie or other movie is played, the confidence of the sensitivity is increased for this classifier.

Figure 4:
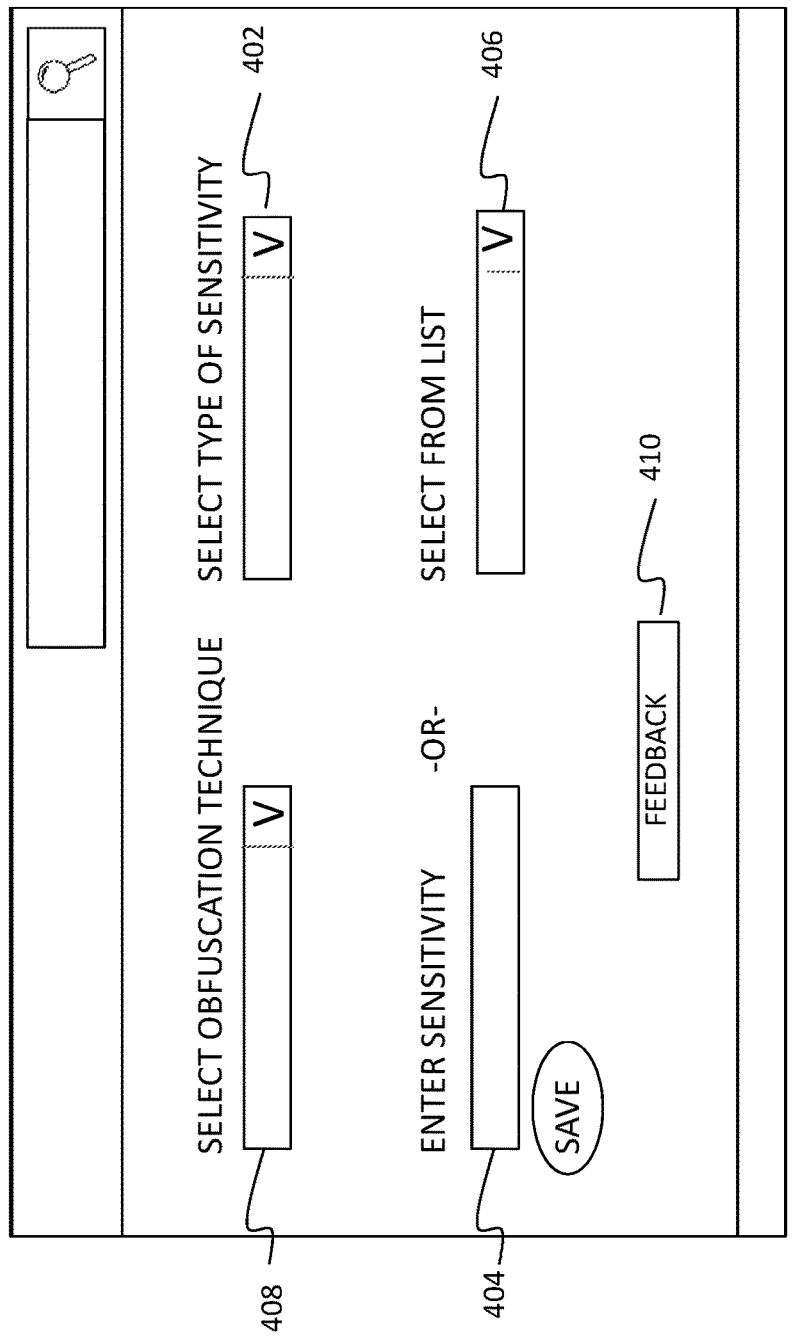
FIG. 4 depicts a user interface screen including sample user-specified sensitivities and feedback in accordance with an embodiment of the invention.

The architecture 100 also includes an obfuscator engine 108, user settings 110, and an obfuscated content player 112. The user settings 110 enable the selection of options by a user to indicate what types of elements in a media file are considered to be sensitive to that user or family of users. A sample user interface illustrating the user settings is shown in FIG. 4. In an embodiment, the obfuscator engine 108 receives the content 102, and the user settings 110 are applied, in conjunction with the index, via the obfuscator engine 108. The obfuscator engine 108 outputs obfuscated content, which is provided for playback on the obfuscated content player 112. The media file may be obfuscated using a variety of techniques. For example, a predefined image may be superimposed over the objectionable image. Alternatively, a blurring technique may be used in which the spatial resolution of portions of the image is reduced. In an embodiment, the type of obfuscation may be a selectable parameter provided to the user.

The architecture 100 also includes a feedback loop in which information derived from the obfuscated video playback is provided to a feedback analyzer 114, and the feedback analyzer 114 processes the information and incorporates the information into the training data 106.

Figure 2:
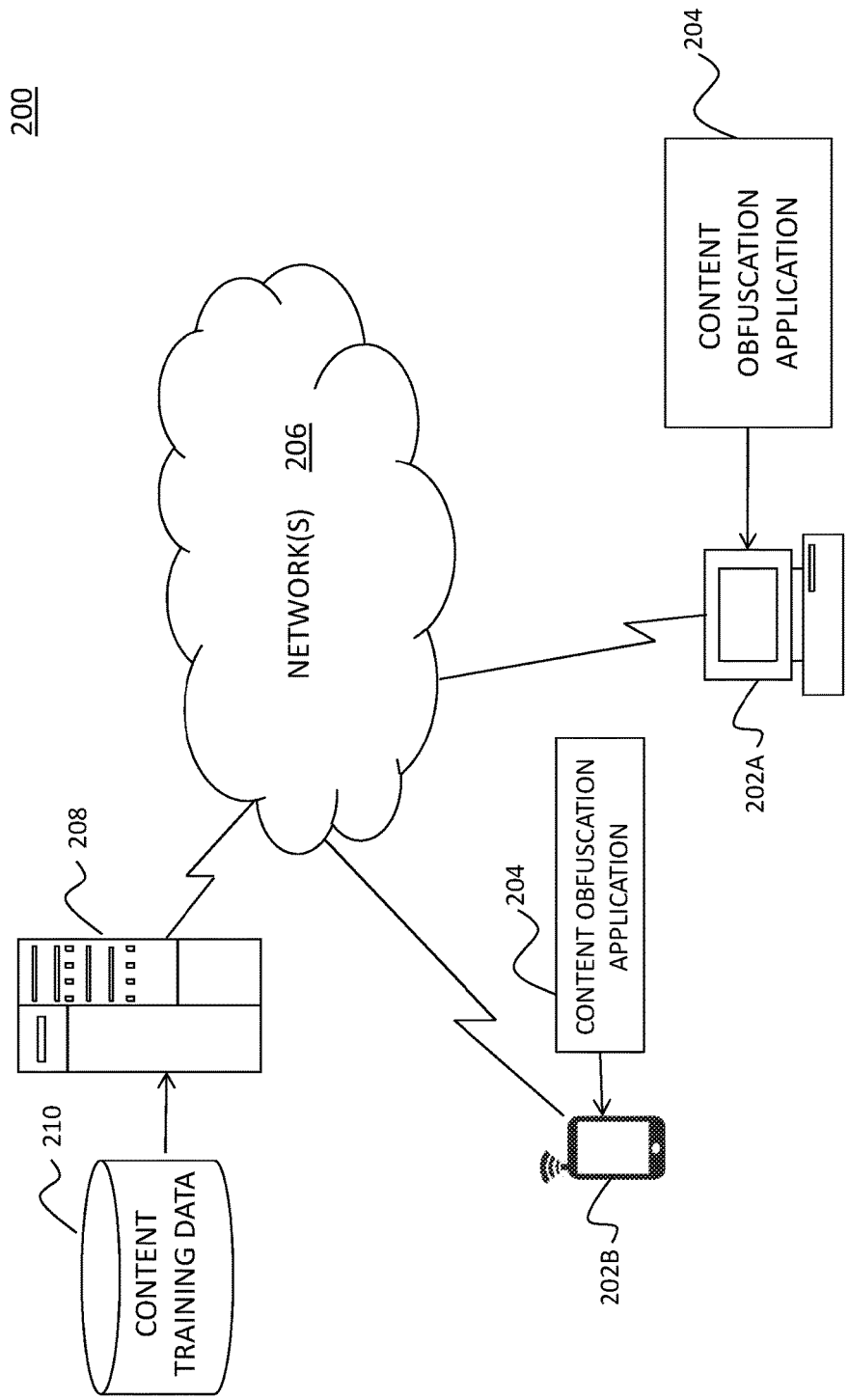
FIG. 2 depicts a block diagram of a system upon which user-configurable settings for content obfuscation may be implemented in accordance with an embodiment of the invention.

Turning now to FIG. 2, a system 200 upon which the user-configurable settings for content obfuscation may be implemented will now be described in one embodiment. The system 200 includes end user devices 202A and 202B and a content server computer 208, each of which is communicatively coupled to one or more networks 206. The end user devices 202A and 202B are collectively referred to as user devices 202. Each of the end user devices 202 corresponds to the obfuscated content player 112 of FIG. 1.

The user device 202A may be general-purpose computer, e.g., a desktop, laptop, etc. The user device 202B may be a portable communications device, such as a smart phone, tablet, personal digital assistant, etc. In an embodiment, each of the user devices implements a content obfuscation application 204. The user devices 202 may represent consumer devices owned and/or operated by one or more individuals. The user devices 202 may each also store user settings established through the content obfuscation application 204, as well as obfuscated content. A user who plays media files at the user devices is referred to herein as a viewer.

The content server computer 208 is a network resource that is accessible by the user devices 202 over one or more networks, such as network(s) 206. In an embodiment, the content server computer 208 may be implemented by a content provider enterprise that distributes content (e.g., broadcast, cable, premium programming, etc.) to end users. Alternatively, the content server computer 208 may be implemented by a third-party application service provider that hosts or manages content distribution and related services for one or more content provider enterprises. In a further embodiment, the content server computer 208 may be implemented by a video monitoring service that monitors surveillance video from various entities, such as businesses or households.

A storage device 210 is communicatively coupled to the content server computer 208. The storage device 210 stores content (content 102) for distribution, as well as training data (training data 106). In one embodiment, the content may be consumer programming. In addition, the content may include surveillance or security video.

The training data is updated over time based on feedback associated with obfuscated video that has been presented to end users. The training data may also be updated from further processing of media files via neural networks that can further refine the feature vectors, which can result in greater confidence scores of resulting tagged images.

Networks 206 may include a combination of one or more different types of networks (e.g., local area network, wide area network, Internet, satellite, or terrestrial network, to name a few).

While only one content server computer 208 is shown in FIG. 2, for ease of description, it will be understood that multiple content server computers may be implemented in order to realize the advantages of the embodiments herein. For example, one content server computer may distribute content over a broadband cable network, while another content server computer may distribute content as on-demand Internet streaming media for subscribing users.

Figure 3:
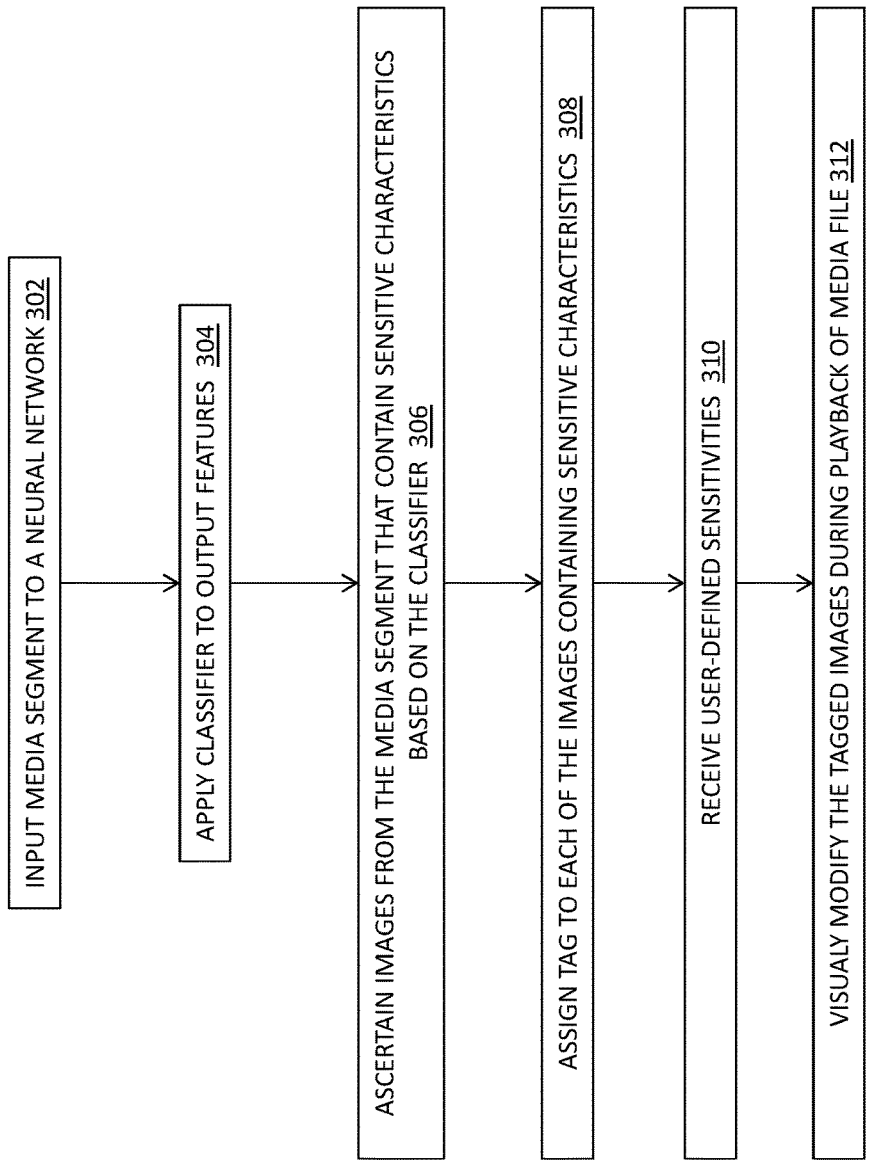
FIG. 3 depicts a flow diagram of a process for implementing user-configurable settings for content obfuscation according to an embodiment of the invention.

Turning now to FIG. 3, a process for implementing the user-configurable settings for content obfuscation will now be described in an embodiment. The process in blocks 302-308 are iteratively performed for each media segment of a given media file.

At block 302, a media segment is input to a neural network. In a non-limiting embodiment, the neural network may be a deep convolutional neural network. The output of the neural network includes features associated with the media segment. At block 304, a classifier (e.g., training data) is applied to features output by the neural network. The classifier specifies images that are predetermined to include sensitive characteristics.

In block 306, images from the media segment determined to contain the sensitive characteristics are ascertained based on the classifier. For example, in an action movie, sensitive characteristics may include weapons, acts of violence, blood, or other similar characteristics. In block 308, a tag is assigned to each of the images in the media segment that contain the sensitive characteristics. The tag indicates a type of sensitivity (e.g., private, security, emotional response) and may also include a descriptive indicator of the nature of the sensitive characteristic. An index may be generated that includes the tagged elements.

In block 310, a user who is interested in viewing the media file enters one or more user-defined sensitivities into a user interface provided by the content obfuscation application. A sample user interface 400 is shown in FIG. 4. In one embodiment, the user may preselect the sensitivities that are to be applied globally to any media file received. In another embodiment, the user may enter sensitivities on a media file-by-media file basis. In a further embodiment, a compiled listing of sensitivities (e.g., via the index) for a given media file may be presented to the user, such that the user can select from the listing which sensitivities to apply when obfuscating aspects of the media file. The sensitivities can be broadly defined (e.g., acts of violence) or may be more granular in nature (e.g., blood, a war scene, etc.). A user-defined sensitivity may indicate any action or condition that is considered objectionable to the user and which can be identified from a media file through the processing described herein.

As shown in FIG. 4, a user may select a type of sensitivity through option 402. The user may then enter any particular sensitivities through option 404 or may select from a preset listing through option 406. The user may also select an obfuscation technique to apply using option 408. For example, the user can select reduced resolution or substitute image. The substitute image can be one of various images that are presented for the user to select from. As indicated above, the user-configurable settings for content obfuscation collects feedback from the user, which can be implemented through option 410.

In an embodiment, the content obfuscation application identifies a subset of the tagged images that correlate to the user-defined sensitivities, and in block 312, the content obfuscation application visually modifies, during playback of the media, an appearance of the subset of the tagged images. The content obfuscation application may obfuscate a single aspect or portion of an image (e.g., a weapon) while leaving the remaining features of the image intact so as to maintain context for the viewer. For example, suppose the media file is a documentary about World War II and a parent is interested in obscuring images in a least restrictive manner so that the educational content of the media file can be experienced.

As indicated above, the feedback option (option 410) enables the user to rate the obfuscation technique selected, as well as provide additional useful information. The process includes evaluating the rating against ratings from other users having matching sensitivities of the user. The process can use the results of the evaluation to suggest a particular obfuscation technique to future users having the matching sensitivities.

In an embodiment, the user-configurable settings for content obfuscation may be configured to obfuscate audio portions of media files that are determined to impact a user's sensitivities. For example, using sound wave analysis, a media segment in which a sound wave frequency exceeds some predetermined threshold may be obfuscated by reducing the volume of the audio or masking the audio with another sound file. In an embodiment, the identified portion of the audio may be tagged with a type of sensitivity similar to the tagging applied to video portions. The audio obfuscation techniques can be applied in synchrony with video obfuscation techniques, such that e.g., if a loud scream is accompanied by an act of violence, the sound and image portions of the file can be obfuscated.

Technical effects and benefits include providing user-configurable settings for content obfuscation. The user-configurable settings for content obfuscation provide modification of video elements based on user-defined sensitivities. The sensitivities may include, e.g., emotional response, privacy, security, or other sensitivities. Elements subject to obfuscation may include images depicting objects used in the commission of violent acts, faces of people subject to privacy concerns, victims of violence, or any element that is determined to contribute to the defined sensitivities. The user-configurable settings for content obfuscation are configured to use prediction, machine learning algorithms, and neural networks, such as a deep convolutional neural network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   for each media segment in a media file:
      inputting, via a computer processor, the media segment to a neural network;
      applying a classifier to features output by the neural network, the classifier specifying images that are predetermined to include sensitive characteristics;
      determining, from results of the classifier, images in the media segment that contain the sensitive characteristics; and
      assigning, via the computer processor, a tag to each of the images in the media segment that contain the sensitive characteristics, the tag indicating a type of sensitivity;
   receiving at least one user-defined sensitivity, the user-defined sensitivity indicating an action or condition that is considered objectionable to a user;
   identifying a subset of the tagged images that correlate to the user-defined sensitivity;
   receiving a user-selected obfuscation technique; and
   visually modifying, during playback of the media file, an appearance of the subset of the tagged images based on the user-selected obfuscation technique.

2. The method of claim 1, wherein the visually modifying an appearance of the subset of the tagged images includes at least one of:
   superimposing a substitute image over a portion of a corresponding tagged image; and
   reducing resolution of a portion of a corresponding tagged image.

3. The method of claim 1, wherein the type of sensitivity includes at least one of:
   privacy;
   security; and
   emotional response.

4. The method of claim 1, wherein the media file is a surveillance video, the type of sensitivity is privacy, and the visually modifying an appearance of the subset of the tagged images includes obfuscating a human face detected in the media file.

5. The method of claim 1, further comprising:
calculating a confidence value for each of the tagged images, the confidence value indicating a level of confidence that the corresponding tagged image resulting from the classifier reflects sensitive subject matter, wherein the confidence value is determined as a function of contextually related features in the media file, at least one of which includes the sensitive characteristics.

6. The method of claim 1, wherein visually modifying an appearance of the subset of the tagged images includes applying the user-selected obfuscation technique to the subset of the tagged images.

7. The method of claim 6, further comprising:
receiving feedback from the user responsive to the playback of the media file, the feedback comprising a rating specifying a degree to which the obfuscation technique alleviated a sensitivity of the user while maintaining context of the media file;
evaluating the rating against ratings from other users having matching sensitivities of the user; and
using results of the evaluating to suggest a particular obfuscation technique to future users having the matching sensitivities.

8. A system, comprising:
a memory having computer readable instructions; and
a processor for executing the computer readable instructions, the computer readable instructions including:
for each media segment in a media file:
inputting the media segment to a neural network;
applying a classifier to features output by the neural network, the classifier specifying images that are predetermined to include sensitive characteristics;
determining, from results of the classifier, images in the media segment that contain the sensitive characteristics; and
assigning a tag to each of the images in the media segment that contain the sensitive characteristics, the tag indicating a type of sensitivity;
receiving at least one user-defined sensitivity, the user-defined sensitivity indicating an action or condition that is considered objectionable to a user;
identifying a subset of the tagged images that correlate to the user-defined sensitivity;
receiving a user-selected obfuscation technique; and
visually modifying, during playback of the media file, an appearance of the subset of the tagged images based on the user-selected obfuscation technique.

9. The system of claim 8, wherein the visually modifying an appearance of the subset of the tagged images includes at least one of:
superimposing a substitute image over a portion of a corresponding tagged image; and
reducing resolution of a portion of a corresponding tagged image.

10. The system of claim 8, wherein the type of sensitivity includes at least one of:
privacy;
security; and
emotional response.

11. The system of claim 8, wherein the media file is a surveillance video, the type of sensitivity is privacy, and the visually modifying an appearance of the subset of the tagged images includes obfuscating a human face detected in the media file.

12. The system of claim 8, wherein the computer readable instructions further comprise:
calculating a confidence value for each of the tagged images, the confidence value indicating a level of confidence that the corresponding tagged image resulting from the classifier reflects sensitive subject matter, wherein the confidence value is determined as a function of contextually related features in the media file, at least one of which includes the sensitive characteristics.

13. The system of claim 8, wherein visually modifying an appearance of the subset of the tagged images includes applying the user-selected obfuscation technique to the subset of the tagged images.

14. The system of claim 13, wherein the computer readable instructions further comprise:
receiving feedback from the user responsive to the playback of the media file, the feedback comprising a rating specifying a degree to which the obfuscation technique alleviated a sensitivity of the user while maintaining context of the media file;
evaluating the rating against ratings from other users having matching sensitivities of the user; and
using results of the evaluating to suggest a particular obfuscation technique to future users having the matching sensitivities.

15. A computer program product comprising a computer readable storage medium having program instructions embodied therewith, wherein the computer readable storage medium is not a transitory signal per se, the program instructions executable by a computer processor to cause the computer processor to perform a method comprising:
for each media segment in a media file:
inputting the media segment to a neural network;
applying a classifier to features output by the neural network, the classifier specifying images that are predetermined to include sensitive characteristics;
determining, from results of the classifier, images in the media segment that contain the sensitive characteristics; and
assigning a tag to each of the images in the media segment that contain the sensitive characteristics, the tag indicating a type of sensitivity;
receiving at least one user-defined sensitivity, the user-defined sensitivity indicating an action or condition that is considered objectionable to a user;
identifying a subset of the tagged images that correlate to the user-defined sensitivity;
receiving a user-selected obfuscation technique; and
visually modifying, during playback of the media file, an appearance of the subset of the tagged images based on the user-selected obfuscation technique.

16. The computer program product of claim 15, wherein the visually modifying an appearance of the subset of the tagged images includes at least one of:
superimposing a substitute image over a portion of a corresponding tagged image; and
reducing resolution of a portion of corresponding tagged image.

17. The computer program product of claim 15, wherein the type of sensitivity includes at least one of:
privacy;
security; and
emotional response.

18. The computer program product of claim 15, wherein the media file is a surveillance video, the type of sensitivity is privacy, and the visually modifying an appearance of the subset of the tagged images includes obfuscating a human face detected in the media file.

19. The computer program product of claim 15, wherein the program instructions are further executable to perform:
   calculating a confidence value for each of the tagged images, the confidence value indicating a level of confidence that the corresponding tagged image resulting from the classifier reflects sensitive subject matter, wherein the confidence value is determined as a function of contextually related features in the media file, at least one of which includes the sensitive characteristics.

20. The computer program product of claim 15, wherein visually modifying an appearance of the subset of the tagged images includes applying the user-selected obfuscation technique to the subset of the tagged images.

* * * * *